United States Patent [19]

Kikuchi et al.

[11] Patent Number: 4,730,907
[45] Date of Patent: Mar. 15, 1988

[54] COMPACT ZOOM LENS SYSTEM

[75] Inventors: Juro Kikuchi; Toshihiro Imai, both of Tokyo, Japan

[73] Assignee: Olympus Optical Co., Ltd., Tokyo, Japan

[21] Appl. No.: 678,160

[22] Filed: Dec. 4, 1984

[30] Foreign Application Priority Data

Dec. 5, 1983 [JP] Japan ................. 58-228483

[51] Int. Cl.$^4$ ................. G02B 15/177; G02B 15/163
[52] U.S. Cl. ................. 350/426; 350/427
[58] Field of Search ................. 350/423, 426, 427

[56] References Cited

U.S. PATENT DOCUMENTS 4,094,586  6/1978  Sato et al. ................. 350/427
4,647,160  3/1987  Ikemori ................. 350/426

FOREIGN PATENT DOCUMENTS 58-111013  7/1983  Japan .

Primary Examiner—John K. Corbin
Assistant Examiner—Scott J. Sugarman
Attorney, Agent, or Firm—Cushman, Darby & Cushman

[57] ABSTRACT

A compact zoom lens system comprising a first lens unit having negative refractive power and arranged as a movable lens unit, a second lens unit having positive refractive power and arranged as a movable lens unit, and a third lens unit arranged as a fixed lens unit, the compact zoom lens system being arranged that the third lens unit comprises a meniscus lens which is concave toward the object side and that aberrations are corrected favorably.

6 Claims, 11 Drawing Figures

COMPACT ZOOM LENS SYSTEM

BACKGROUND OF THE INVENTION (a) Field of the Invention

The present invention relates to a compact zoom lens system and, more particularly, to a compact zoom lens system for photographing of which the zoom ratio is 2.

(b) Description of the Prior Art

The zoom lens system disclosed in Japanese published unexamined patent application No. 111013/83 is known as a zoom lens system comprising a first lens unit having negative refractive power and arranged as a movable lens unit, a second lens unit having positive refractive power and arranged as a movable lens unit, and a third lens unit arranged as a fixed lens unit. However, the above-mentioned known zoom lens system has disadvantages described below.

That is, in case of said known zoom lens system, the third lens unit is arranged as a meniscus lens which is convex toward the object side. Therefore, flare caused by offaxial rays becomes unfavourable, and the intensity of light in the marginal portion becomes insufficient.

Besides, the marginal portion of the third lens unit comes to a position closer to the film side. Therefore, to prevent the third lens unit from interfering with the mirror when said known zoom lens system is used with a single-lens reflex camera, it is necessary to locate the third lens unit at a somewhat long distance from the film surface. Consequently, it is impossible to make the overall length of the lens system satisfactorily short, and the lens system as a whole cannot be made compact.

Furthermore, as the apex of the third lens unit comes to a position closer to the object side, the moving range of the second lens unit should be shifted toward the object side. This also means that it is impossible to make the overall length of the lens system short.

SUMMARY OF THE INVENTION

It is, therefore, a primary object of the present invention to provide a compact zoom lens system comprising a first lens unit having negative refractive power and arranged as a movable lens unit, a second lens unit having positive refractive power and arranged as a movable lens unit, and a third lens unit arranged as a fixed lens unit, said compact zoom lens system being arranged that said third lens unit comprises a meniscus lens which is concave toward the object side and offaxial flare (flare to be caused by offaxial rays) and other aberrations of said zoom lens system are thereby corrected favorably.

Generally, zoom lens systems can be made compact when the focal lengths of movable lens groups are made short. However, in case of zoom lens systems comprising two lens units wherein the first lens unit has negative refractive power and the second lens group has positive refractive power, offaxial flare becomes unfavourable in the teleposition and astigmatism (especially, curvature of field) largely inclines toward the "minus" side in the wide position when the focal lengths of those movable lens units are made short.

In the present invention, the above-mentioned aberrations are corrected by arranging that the third lens unit comprising a meniscus lens, which is approximately concentric with the position of exit pupil of a system comprising the first and second lens groups, is provided in a position on the image side of the first lens unit having negative refractive power and arranged as a movable lens unit and the second lens unit having positive refractive power and arranged as a movable lens unit. That is, it is now possible to reduce the variation of astigmatism of the lens system by adjusting the thickness or the third lens unit. Therefore, even when it is arranged to correct astigmatism (especially, meridional image surface) which largely inclines toward the "minus" side in the wide position, said astigmatism does not incline toward the "plus" side in the teleposition and, consequently, astigmatism is corrected favourably in all positions of zooming. Furthermore, it is possible to reduce the variation of spherical aberration of the lens system by adjusting the radius of curvature of said third lens unit. Therefore, when it is arranged that spherical aberration is corrected satisfactorily favourably in the wide position where the F number when the stop is fully opened is small, spherical aberration in the teleposition is also corrected favorably. Moreover, in the teleposition, it is possible to eliminate offaxial flare to be caused by coma because the field angle is small in the teleposition.

Here, when the absolute value $|f_3|$ of the focal length of the third lens unit is selected as a large value, the eccentricity and dispersion in the thickness of the lens constituting the third lens group and dispersion in the airspaces in front and rear of said lens do not cause conspicuous influence on the quality of image and, consequently, it becomes easy to design the lens mount and to assemble the lenses. Besides, in case of a lens with a comparatively small thickness, it automatically becomes $r_a \approx r_b$ when radii of curvature of the front and rear surfaces thereof are respectively represented by reference symbols $r_a$ and $r_b$. Especially, when it is arranged that the value of $r_a$ is approximately equal to the value of $r_b$, the focal length $f_3$ of the third lens unit becomes $f_3 > 0$, and the thickness of the meniscus lens constituting the third lens unit becomes approximately uniform at all portions thereof. Therefore, it is possible to easily arrange so as to manufacture the lens by molding or by a press and, moreover, centering becomes unnecessary. Consequently, it is possible to obtain a zoom lens system which can be manufactured more easily at a low cost and, at the same time, which has stable performance.

Due to the reason described so far, the zoom lens system according to the present invention is arranged to have the afore-mentioned lens composition and, at the same time, arranged that the value of $|f_3|$ becomes a large value which fulfills the condition (1) shown below, when the focal length of the third lens unit is represented by reference symbol $f_3$, so that the manufacture of the lenses becomes easy without weakening the afore-mentioned correcting effect for aberrations.

$$|f_3|/f_W > 10 \tag{1}$$

In the condition (1) shown in the above, reference symbol $f_W$ represents the focal length of the zoom lens system as a whole in the wide position.

If the absolute value $|f_3|$ of the focal length of the third lens group becomes smaller than the range defined by the condition (1), the manufacture of the lenses does not become easy due to the reasons that the radii of curvature of respective surfaces of the meniscus lens constituting the third lens unit become small, and so forth.

As described so far, it is possible to obtain a zoom lens system which enables to attain the object of the present invention by adopting the afore-mentioned lens composition and, at the same time, arranging to fulfill the condition (1). However, to obtain a zoom lnes system of which the manufacture is still easier and the price is low, it is preferable to arrange so that said zoom lens system fulfills the conditions (2) and (3) shown below.

$$r_a > r_b \quad (2)$$

$$f_3 > 0 \quad (3)$$

DETAILED DESCRIPTION OF THE PREFERRED EMBODIMENTS

Figure 1:
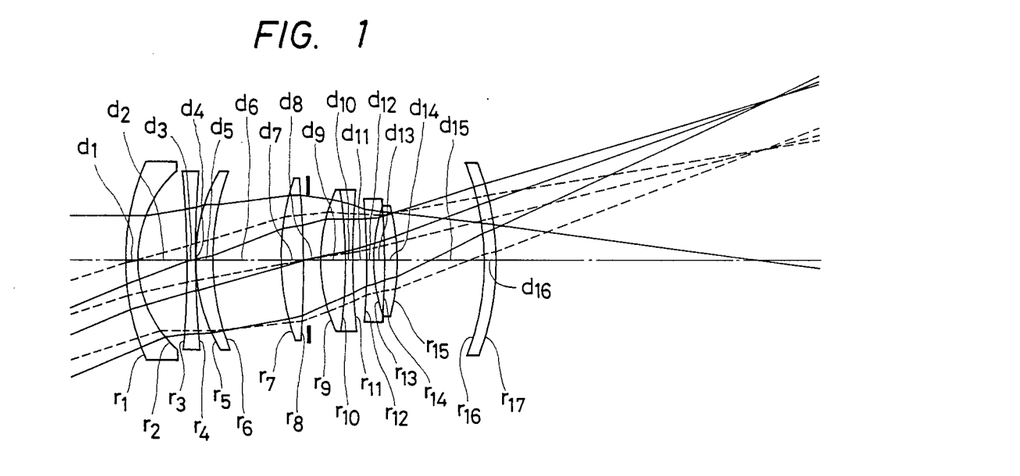
FIG. 1 shows a sectional view of Embodiment 1 of the compact zoom lens system according to the present invention.
Figure 2:
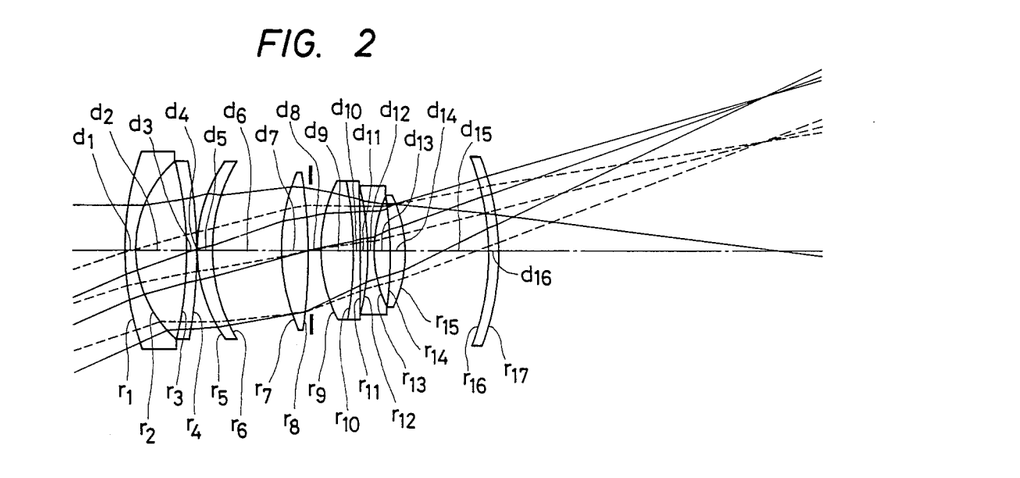
FIG. 2 shows a sectional view of Embodiments 2 and 3 of the compact zoom lens system according to the present invention.
Figure 3:
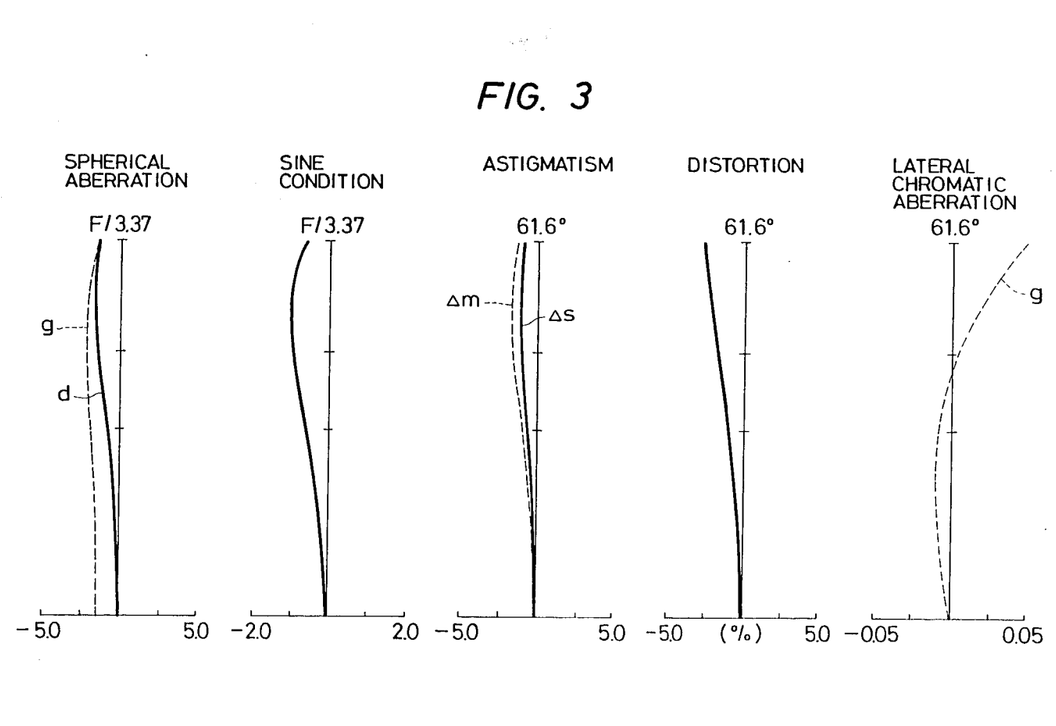
FIGS. 3 through 5 respectively show graphs illustrating aberration curves of Embodiment 1 of the present invention.
Figure 4:
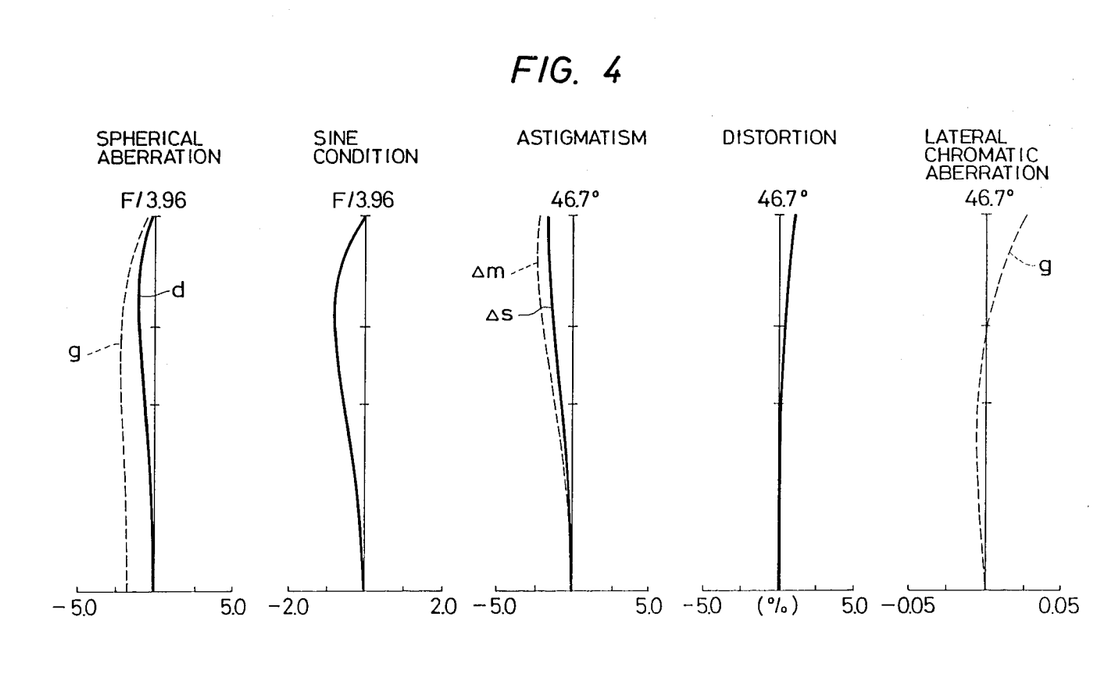
Figure 5:
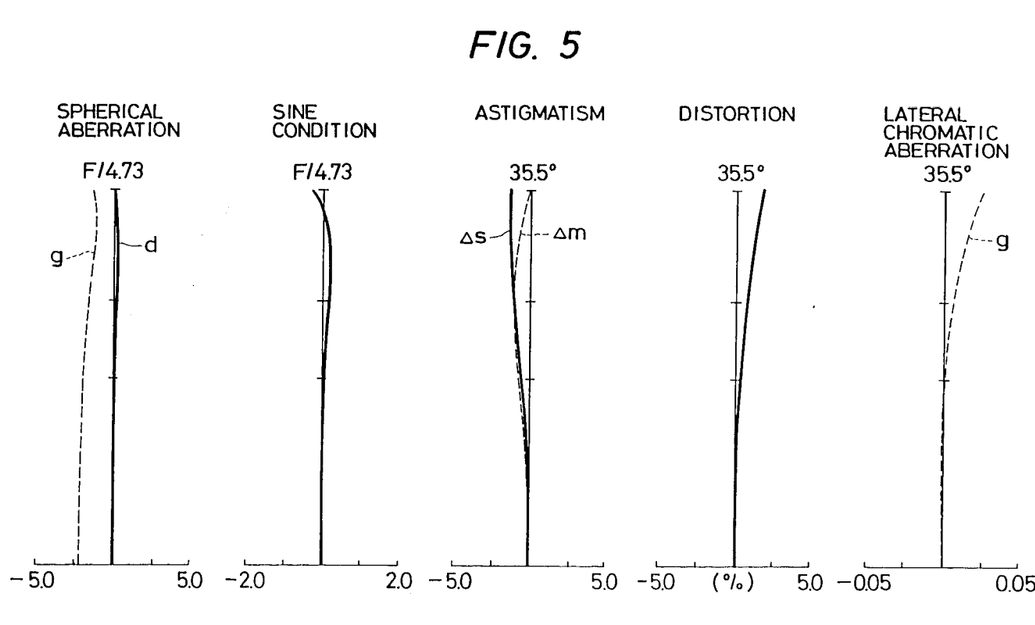

Preferred embodiments of the compact zoom lens system according to the present invention described so far have the lens configuration shown in FIG. 1 or 2. That is, the first lens unit comprises a negative meniscus lens, a biconcave or negative meniscus lens, and a positive meniscus lens, the second lens unit comprises a positive lens, a cemented doublet which consists of a biconvex lens and a biconcave or negative meniscus lens, a negative lens, and a positive lens, and the third lens unit comprises a meniscus lens which is concave toward the object side.

Now, numerical data of respective embodiments of the present invention are shown below.

Embodiment 1

$r_1 = 94.354$
$d_1 = 4.42$, $n_1 = 1.6968$, $\nu_1 = 55.5$
$r_2 = 44.247$
$d_2 = 19.35$
$r_3 = -387.983$
$d_3 = 3.59$, $n_2 = 1.6968$, $\nu_2 = 55.5$
$r_4 = 410.861$
$d_4 = 0.28$
$r_5 = 63.918$
$d_5 = 7.24$, $n_3 = 1.7552$, $\nu_3 = 27.5$
$r_6 = 97.865$
$d_6$ (variable)
$r_7 = 85.164$
$d_7 = 8.83$, $n_4 = 1.6516$, $\nu_4 = 58.7$
$r_8 = -305.402$
$d_8 = 6.61$
$r_9 = 53.253$
$d_9 = 10.75$, $n_5 = 1.62041$, $\nu_5 = 60.3$
$r_{10} = -129.178$
$d_{10} = 2.53$, $n_6 = 1.76182$, $\nu_6 = 26.5$
$r_{11} = 553.391$
$d_{11} = 5.6$
$r_{12} = -189.913$
$d_{12} = 2.35$, $n_7 = 1.783$, $\nu_7 = 36.2$
$r_{13} = 49.284$
$d_{13} = 4.54$
$r_{14} = -358.404$
$d_{14} = 5.52$, $n_8 = 1.72825$, $\nu_8 = 28.5$
$r_{15} = -66.234$
$d_{15}$ (variable)
$r_{16} = -99.290$
$d_{16} = 4.58$, $n_9 = 1.50137$, $\nu_9 = 56.4$
$r_{17} = -96.695$
$f = 100 \sim 186.5$
$f_1 = -137.869$, $f_2 = 90.607$, $f_3 = 4642.022$

| | wide position | standard position | teleposition |
|---|---|---|---|
| f | 100 | 138 | 186.5 |
| $d_6$ | 60.76 | 26.61 | 3.28 |
| $d_{15}$ | 9.02 | 34.38 | 67.12 |

Embodiment 2

$r_1 = 104.173$
$d_1 = 4.14$, $n_1 = 1.694$, $\nu_1 = 53.2$
$r_2 = 45.889$
$d_2 = 20.98$
$r_3 = -135.296$
$d_3 = 3.59$, $n_2 = 1.697$, $\nu_2 = 55.5$
$r_4 = -210.1786$
$d_4 = 0.28$
$r_5 = 57.556$
$d_5 = 6.90$, $n_3 = 1.740$, $\nu_3 = 28.3$
$r_6 = 70.641$
$d_6$ (variable)
$r_7 = 67.193$
$d_7 = 9.56$, $n_4 = 1.620$, $\nu_4 = 60.3$
$r_8 = -256.466$
$d_8 = 6.35$
$r_9 = 60.207$
$d_9 = 12.61$, $n_5 = 1.620$, $\nu_5 = 60.3$
$r_{10} = -126.391$
$d_{10} = 2.72$, $n_6 = 1.722$, $\nu_6 = 29.2$
$r_{11} = -1279.487$
$d_{11} = 2.99$
$r_{12} = -95.4327$
$d_{12} = 2.70$, $n_7 = 1.834$, $\nu_7 = 37.2$
$r_{13} = 54.758$
$d_{13} = 5.52$
$r_{14} = -182.709$
$d_{14} = 5.96$, $n_8 = 1.723$, $\nu_8 = 38.0$
$r_{15} = -54.119$
$d_{15}$ (variable)
$r_{16} = -86.957$
$d_{16} = 4.14$, $n_9 = 1.501$, $\nu_9 = 56.4$
$r_{17} = -87.150$
$f = 100 \sim 186.5$
$f_1 = -139.077$, $f_2 = 91.301$, $f_3 = 12706.598$

| | wide position | standard position | teleposition |
|---|---|---|---|
| f | 100 | 138 | 186.5 |
| $d_6$ | 62.07 | 26.82 | 2.74 |
| $d_{15}$ | 7.95 | 34.53 | 66.09 |

Embodiment 3

$r_1 = 100.759$
$d_1 = 4.36$, $n_1 = 1.6968$, $\nu_1 = 55.5$
$r_2 = 46.109$
$d_2 = 20.7$
$r_3 = -189.424$
$d_3 = 3.86$, $n_2 = 1.6968$, $\nu_2 = 55.5$
$r_4 = -436.516$
$d_4 = 0.28$
$r_5 = 58.239$
$d_5 = 6.9$, $n_3 = 1.78472$, $\nu_3 = 25.7$
$r_6 = 71.219$
$d_6$ (variable)
$r_7 = 65.405$
$d_7 = 9.25$, $n_4 = 1.62041$, $\nu_4 = 60.3$
$r_8 = -284.555$
$d_8 = 6.35$
$r_9 = 62.534$
$d_9 = 9.94$, $n_5 = 1.6516$, $\nu_5 = 58.67$
$r_{10} = -140.312$
$d_{10} = 5.52$, $n_6 = 1.74077$, $\nu_6 = 27.79$
$r_{11} = 302.355$ -continued

| | | |
|---|---|---|
| $d_{11} = 3.31$ | | |
| $r_{12} = -103.484$ | | |
| $d_{12} = 2.48$ | $n_7 = 1.834$ | $\nu_7 = 37.2$ |
| $r_{13} = 56.398$ | | |
| $d_{13} = 5.47$ | | |
| $r_{14} = -1097.121$ | | |
| $d_{14} = 6.40$ | $n_8 = 1.72342$ | $\nu_8 = 38.0$ |
| $r_{15} = -60.387$ | | |
| $d_{15}$ (variable) | | |
| $r_{16} = -87.445$ | | |
| $d_{16} = 4.17$ | $n_9 = 1.50137$ | $\nu_9 = 56.4$ |
| $r_{17} = -87.567$ | | |
| $f = 100 \sim 186.5$ | | |
| $f_1 = -140.005$, | $f_2 = 91.711$, | $f_3 = 12020.667$ |

| | wide position | standard position | teleposition |
|---|---|---|---|
| f | 100 | 138 | 186.5 |
| $d_6$ | 62.524 | 26.901 | 2.565 |
| $d_{15}$ | 10.014 | 34.922 | 67.087 |

In numerical data of respective embodiments shown in the above, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, reference symbols, $f_1$, $f_2$ and $f_3$ respectively represent focal lengths of respective lens units and reference symbol f represents the focal length of the lens system as a whole.

Out of respective embodiments shown in the above, Embodiment 1 has the lens configuration shown in FIG. 1 wherein said first lens unit comprises a negative meniscus lens convex toward the object side, a negative lens, and a positive meniscus lens convex toward the object side, said second lens group comprises a positive lens, a cemented doublet which consists of a positive lens and a negative lens, a negative lens, and a positive meniscus lens convex toward the image side, and said third lens unit comprises a meniscus lens concave toward the object side, said Embodiment 1 being arranged by applying the present invention to a generally known zoom lens system comprising two lens unit. That is, in case of the known zoom lens systems comprising two lens units, $f_1$ becomes $|f_1| \approx |f_T|$ when the focal length of the lens system in the teleposition is represented by reference symbol $f_T$. In the zoom lens system according to the present invention, $f_1$ is selected as $|f_1| \approx 0.7|f_T|$. Besides, to make the lens system more compact, $f_2$ is selected as $f_2 \approx f_W$ (reference symbol $f_W$ represents the focal length of the lens system in the wide position) so that the amount of movement of the second lens group for the purpose of zooming becomes small. In spite of the fact that $f_1$ and $f_2$ are selected as above, astigmatism and coma of the zoom lens system according to the present invention are corrected favorably by composing the third lens group as described before.

Furthermore, as $f_1$ is selected as $|f_1| \approx 0.7|f_T|$, the magnification $\beta_2$ of the second lens unit becomes $-10/7 \leq \beta_2 \leq -5/7$ and, consequently, the amount of movement of the second lens group is made small compared with said known zoom lens systems comprising two lens groups in which $\beta_2$ becomes $-1$ in the teleposition.

Besides, as the focal length of the first lens unit is made short ($|f_1|$ is made small), the advancing amount of the first lens unit at the time of focusing is made small. Therefore, decrease in the intensity of light in the marginal portion at the time of focusing is made small, and it is possible to make the effective diameter of the first lens unit small. On the other hand, when the effective diameter of the first lens unit is made large to the same degree as said known zoom lens systems, it is possible to carry out photographing of an object at an extremely short distance, which is generally called macro-photographing, by advancing the first lens group only. Therefore, compared with the case to carry out macro-photographing by additionally attaching a macrophotographing mechanism, the lens system is smaller in size, lighter in weight and lower in price.

Embodoment 2 of the present invention has the lens configuration shown in FIG. 2 wherein said first lens unit comprises a negative meniscus lens convex toward the object side, a negative meniscus lens convex toward the image side, and a positive meniscus lens convex toward the object side, said second lens unit comprises a positive lens, a cemented doublet which consists of a positive lens and a negative lens, a negative lens, and a positive meniscus lens convex toward the image side, and said third lens unit comprises a meniscus lens concave toward the object side. Said Embodiment 2 has all features of Embodiment 1 described in the above. Besides, Embodiment 2 is designed as explained below. That is, refractive power of both of the second and third lenses counted from the object side in the first lens unit are made weak so as to thereby vary the position of the principal point of the first lens unit as a whole, and the lens system is thereby made more compact. Especially, in the teleposition, the airspace $d_6$ is made smaller than the other embodiments. Furthermore, chromatic aberration of the first lens group is varied, and the lens configuration of the second lens unit is modified accordingly so that chromatic aberration of the lens system is thereby corrected favorably.

In the zoom lens system according to the present invention, the radius of curvature $r_{13}$ of the thirteenth surface has large influence on offaxial aberrations. Therefore, in Embodiment 2, the radius of curvature $r_{13}$ of said surface is made large so as to correct the curves of offaxial aberrations favorably.

In case of zoom lens systems in which the first lens unit has negative refractive power, deflection of lower rays of offaxial rays toward the lower side by the first lens unit is larger than deflection of upper rays. Therefore, at the thirteenth surface, deflection of upper rays toward the upper side is made larger than deflection of lower rays so as to eliminate asymmetry of offaxial rays. However, when the radius of curvature of the thirteenth surface is made too small, offaxial rays are deflected largely, and this is not desirable.

In Embodiment 2 of the present invention, the refractive index of the seventh lens is made high so that the radius of curvature of the thirteenth surface becomes large. However, when the radius of curvature of the thirteenth surface becomes too large, it is impossible to make the above-mentioned correction of upper rays. Therefore, it is preferable to select the radius of curvature $r_{13}$ of the thirteenth surface within the range defined by the following condition.

$$0.7f_W > r_{13} > 0.45f_W$$

Embodiment 3 of the present invention has the lens configuration shown in FIG. 2 in the same way as Embodiment 2. The lens system according to Embodiment 3 is designed by modifying the lens system according to Embodiment 2 so that chromatic aberration is corrected more favourably.

The cemented doublet arranged just in rear of the stop is important for correction of chromatic aberration. In Embodiment 3, refractive indices $n_5$ and $n_6$ of the positive and negative lenses constituting the above-mentioned cemented doublet are made large in the state that the ratio $n_5/n_6$ refractive indices and the value of $1/\nu_5 - 1/\nu_6$ related to Abbe's numbers $\nu_5$ and $\nu_6$ of said positive and negative lenses are kept constant, and chromatic aberration is thereby corrected more favorably compared with Embodiment 2.

Figure 6:
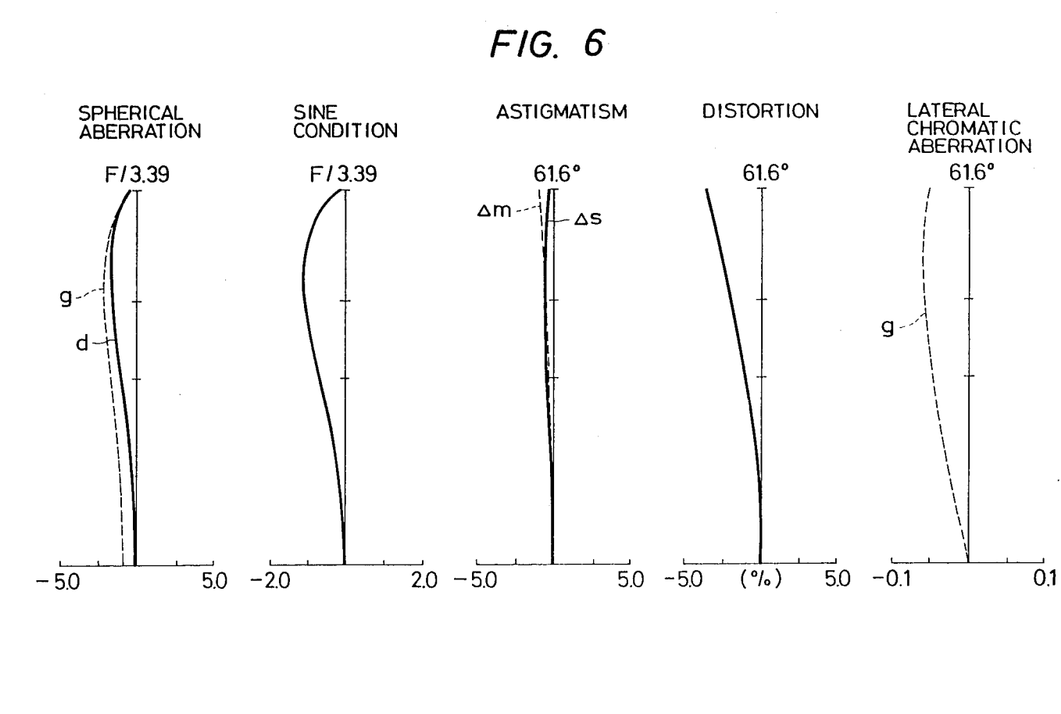
FIGS. 6 through 8 respectively show graphs illustrating aberration curves of Embodiment 2 of the present invention.
Figure 7:
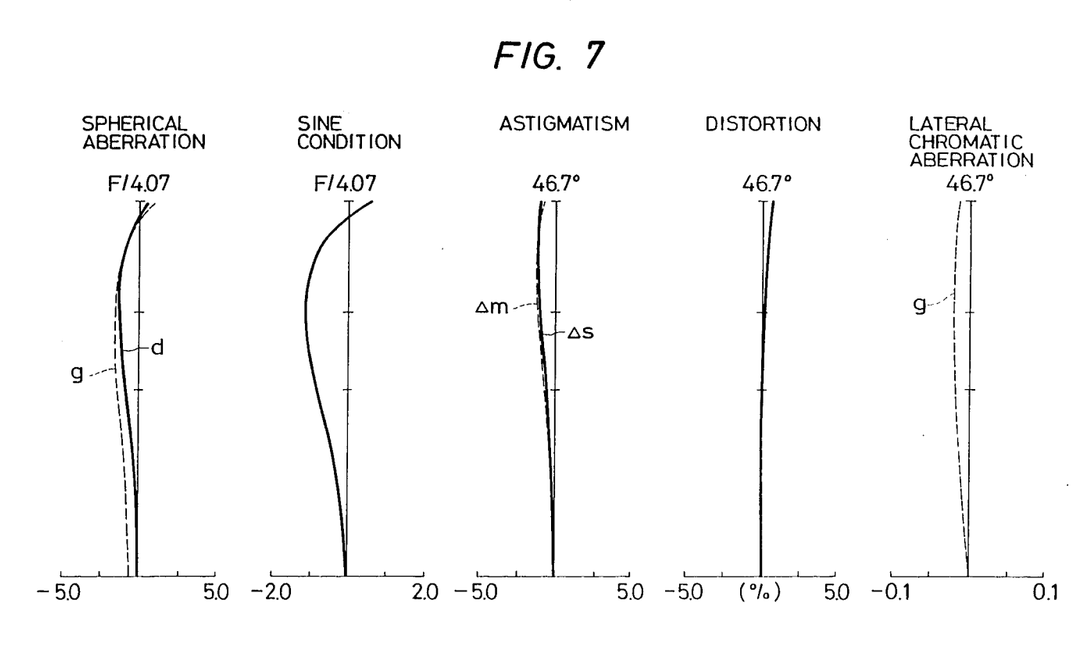
Figure 8:
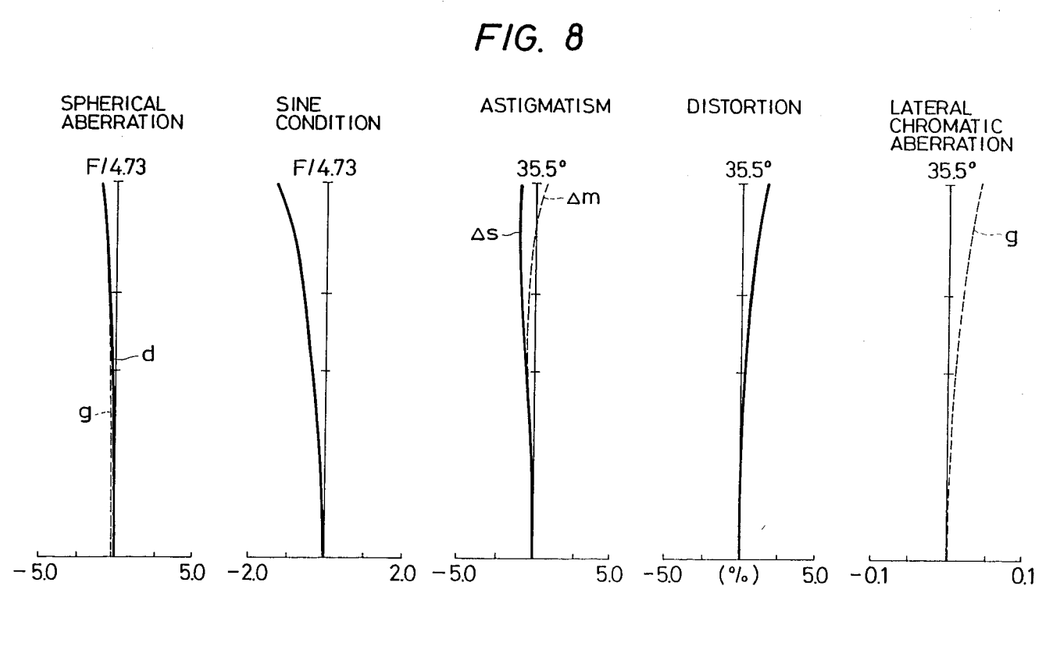
Figure 9:
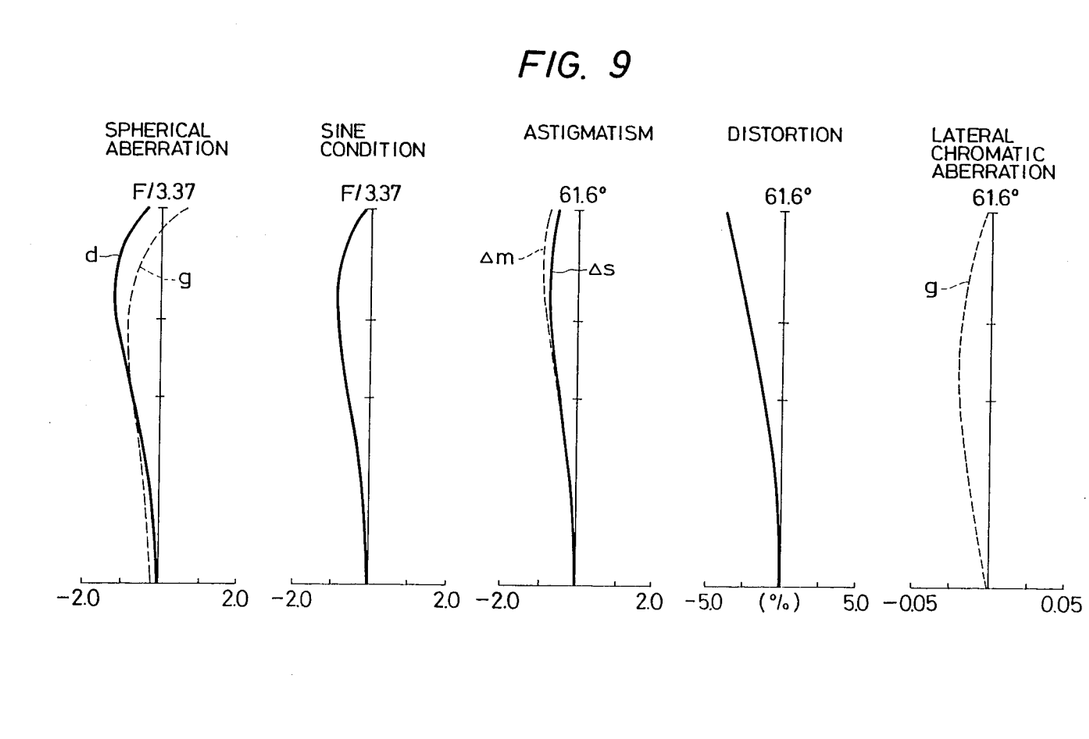
FIGS. 9 through 11 respectively show graphs illustrating aberration curves of Embodiment 3 of the present invention.
Figure 10:
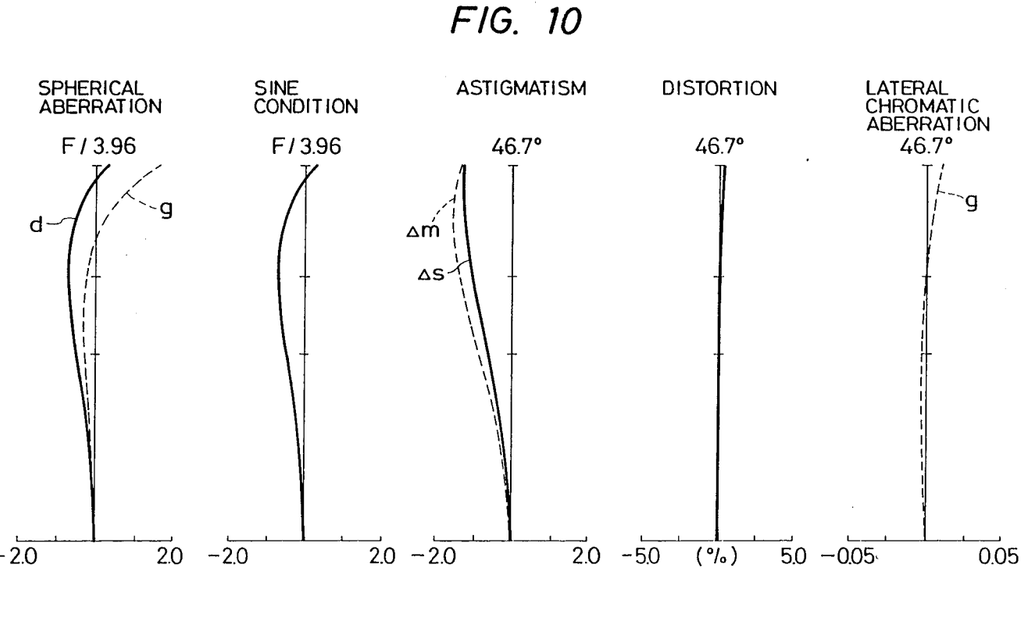
Figure 11:
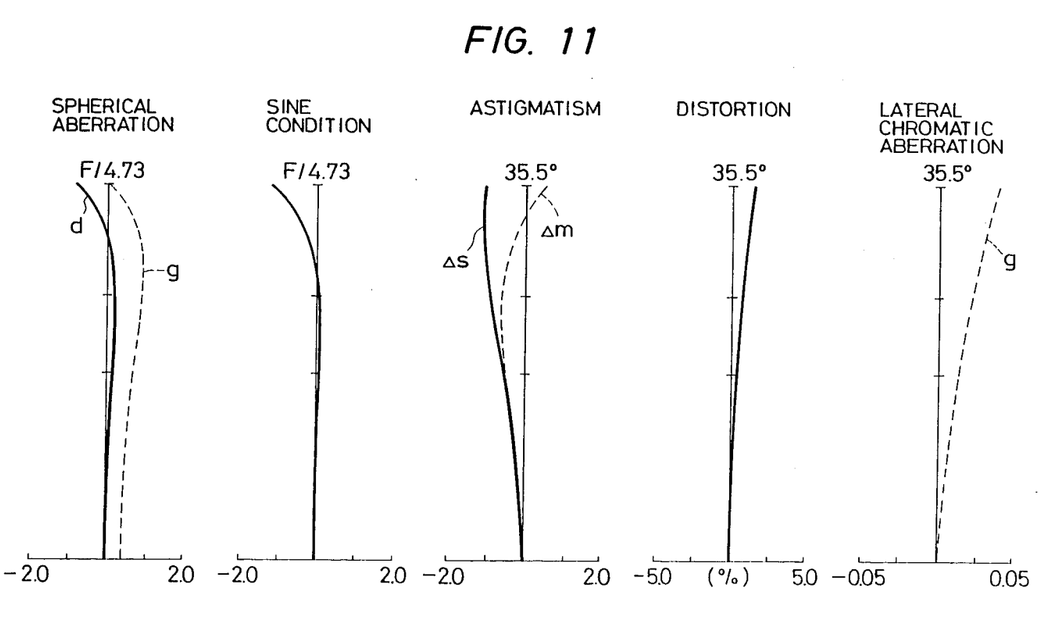

Aberration curves of respective embodiments described so far are shown in FIGS. 3 through 11. Out of them, FIGS. 3, 4 and 5 respectively show aberration curves of Embodiment 1 in the wide position, standard position and teleposition. FIGS. 6, 7 and 8 respectively show aberration curves of Embodiment 2 in the wide position, standard position and teleposition. FIGS. 9, 10 and 11 respectively show aberration curves of Embodiment 3 in the wide position, standard position and teleposition.

As explained in detail up to now and as it will be evident from respective embodiments, the present invention provides a compact zoom lens system of which aberrations are corrected favourably. Besides, the zoom lens system according to the present invention has only two movable lens units and, therefore, it is low in price. Furthermore, as the third lens unit is arranged as a lens having a convex surface on the image side, it is possible to mount the zoom lens system according to the present invention to a single-lens reflex camera, which is provided with a large mirror and is not provided with a swing-back mechanism. As the third lens unit is arranged as a meniscus lens which is convex toward the image side, it is possible to make the moving range of the second lens group large and to make the focal length of the second lens unit long and, therefore, it is possible to make aberrations to be caused by the second lens unit small.

We claim:

1. A compact zoom lens system consisting of a first lens unit having negative refractive power and arranged as a movable lens unit, a second lens unit having positive refractive power and arranged as a movable lens unit, and a third lens unit arranged as a fixed lens unit, said third lens unit comprising a meniscus lens arranged to be concave toward the object side and said compact zoom lens system fulfilling the conditions (1), (2) and (3) shown below:

$$|f_3|f_W > 10 \tag{1}$$

$$r_a \approx r_b \tag{2}$$

$$f_3 > 0 \tag{3}$$

where, reference symbol $f_3$ represents the focal length of said third lens unit, and reference symbol $f_W$ represents the focal length of the lens system as a whole in the wide position, and where reference symbol $r_a$ and $r_b$ respectively represent radii of curvature of respective surfaces of said third lens unit.

2. A compact zoom lens system according to claim 1 wherein said first lens unit comprises a negative meniscus lens convex toward the object side, a negative lens, and a positive meniscus lens convex toward the object side, and said second lens unit comprises a positive lens, a cemented doublet which consists of a positive lens and a negative lens, a negative lens, and a positive meniscus lens convex toward the image side.

3. A compact zoom lens system according to claim 2 which has the following numerical data:

| | | |
|---|---|---|
| $r_1 = 94.354$ | | |
| $d_1 = 4.42$ | $n_1 = 1.6968$ | $\nu_1 = 55.5$ |
| $r_2 = 44.247$ | | |
| $d_2 = 19.35$ | | |
| $r_3 = -387.983$ | | |
| $d_3 = 3.59$ | $n_2 = 1.6968$ | $\nu_2 = 55.5$ |
| $r_4 = 410.861$ | | |
| $d_4 = 0.28$ | | |
| $r_5 = 63.918$ | | |
| $d_5 = 7.24$ | $n_3 = 1.7552$ | $\nu_3 = 27.5$ |
| $r_6 = 97.865$ | | |
| $d_6$ (variable) | | |
| $r_7 = 85.164$ | | |
| $d_7 = 8.83$ | $n_4 = 1.6516$ | $\nu_4 = 58.7$ |
| $r_8 = -305.402$ | | |
| $d_8 = 6.61$ | | |
| $r_9 = 53.253$ | | |
| $d_9 = 10.75$ | $n_5 = 1.62041$ | $\nu_5 = 60.3$ |
| $r_{10} = -129.178$ | | |
| $d_{10} = 2.53$ | $n_6 = 1.76182$ | $\nu_6 = 26.5$ |
| $r_{11} = 553.391$ | | |
| $d_{11} = 5.6$ | | |
| $r_{12} = -189.913$ | | |
| $d_{12} = 2.35$ | $n_7 = 1.783$ | $\nu_7 = 36.2$ |
| $r_{13} = 49.284$ | | |
| $d_{13} = 4.54$ | | |
| $r_{14} = -358.404$ | | |
| $d_{14} = 5.52$ | $n_8 = 1.72825$ | $\nu_8 = 28.5$ |
| $r_{15} = -66.234$ | | |
| $d_{15}$ (variable) | | |
| $r_{16} = -99.290$ | | |
| $d_{16} = 4.58$ | $n_9 = 1.50137$ | $\nu_9 = 56.4$ |
| $r_{17} = -96.695$ | | |
| $f = 100 \sim 186.5$ | | |
| $f_1 = -137.869,$ | $f_2 = 90.607,$ | $f_3 = 4642.022$ |

| | wide position | standard position | teleposition |
|---|---|---|---|
| f | 100 | 138 | 186.5 |
| $d_6$ | 60.76 | 26.61 | 3.28 |
| $d_{15}$ | 9.02 | 34.38 | 67.12 | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, reference symbols $f_1$, $f_2$ and $f_3$ respectively represent focal lengths of said first, second and third lens units, and reference symbol f represents the focal length of the lens system as a whole.

4. A compact zoom lens system according to claim 1 wherein said first lens unit comprises a negative meniscus lens convex toward the object side, a negative meniscus lens convex toward the image side, and a positive meniscus lens convex toward the object side, and said second lens unit comprises a positive lens, a cemented doublet which consists of a positive lens and a negative lens, a negative lens, and a positive meniscus lens convex toward the image side.

5. A compact zoom lens system according to claim 4 which has the following numerical data:

| $r_1 = 104.173$ | | |
|---|---|---|
| $d_1 = 4.14$ | $n_1 = 1.694$ | $\nu_1 = 53.2$ |
| $r_2 = 45.889$ | | |
| $d_2 = 20.98$ | | |
| $r_3 = -135.296$ | | |
| $d_3 = 3.59$ | $n_2 = 1.697$ | $\nu_2 = 55.5$ |
| $r_4 = -210.1786$ | | |
| $d_4 = 0.28$ | | |
| $r_5 = 57.556$ | | |
| $d_5 = 6.90$ | $n_3 = 1.740$ | $\nu_3 = 28.3$ |
| $r_6 = 70.641$ | | |
| $d_6$ (variable) | | |
| $r_7 = 67.193$ | | |
| $d_7 = 9.56$ | $n_4 = 1.620$ | $\nu_4 = 60.3$ |
| $r_8 = -256.466$ | | |
| $d_8 = 6.35$ | | |
| $r_9 = 60.207$ | | |
| $d_9 = 12.61$ | $n_5 = 1.620$ | $\nu_5 = 60.3$ |
| $r_{10} = -126.391$ | | |
| $d_{10} = 2.72$ | $n_6 = 1.722$ | $\nu_6 = 29.2$ |
| $r_{11} = -1279.487$ | | |
| $d_{11} = 2.99$ | | |
| $r_{12} = -95.4327$ | | |
| $d_{12} = 2.70$ | $n_7 = 1.834$ | $\nu_7 = 37.2$ |
| $r_{13} = 54.758$ | | |
| $d_{13} = 5.52$ | | |
| $r_{14} = -182.709$ | | |
| $d_{14} = 5.96$ | $n_8 = 1.723$ | $\nu_8 = 38.0$ |
| $r_{15} = -54.119$ | | |
| $d_{15}$ (variable) | | |
| $r_{16} = -86.957$ | | |
| $d_{16} = 4.14$ | $n_9 = 1.501$ | $\nu_9 = 56.4$ |
| $r_{17} = -87.150$ | | |
| $f = 100 \sim 186.5$ | | |
| $f_1 = -139.077$, | $f_2 = 91.301$, | $f_3 = 12706.598$ |

| | wide position | standard position | teleposition |
|---|---|---|---|
| f | 100 | 138 | 186.5 |
| $d_6$ | 62.07 | 26.82 | 2.74 |
| $d_{15}$ | 7.95 | 34.53 | 66.09 | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, reference symbols $f_1$, $f_2$ and $f_3$ respectively represent focal lengths of said first, second and third lens units and reference symbol f represents the focal length of the lens system as a whole.

6. A compact zoom lens system according to claim 4 which has the following numerical data:

| $r_1 = 100.759$ | | |
|---|---|---|
| $d_1 = 4.36$ | $n_1 = 1.6968$ | $\nu_1 = 55.5$ |
| $r_2 = 46.109$ | | |
| $d_2 = 20.7$ | | |
| $r_3 = -189.424$ | | |
| $d_3 = 3.86$ | $n_2 = 1.6968$ | $\nu_2 = 55.5$ |
| $r_4 = -436.516$ | | |
| $d_4 = 0.28$ | | |
| $r_5 = 58.239$ | | |
| $d_5 = 6.9$ | $n_3 = 1.78472$ | $\nu_3 = 25.7$ |
| $r_6 = 71.219$ | | |
| $d_6$ (variable) | | |
| $r_7 = 65.405$ | | |
| $d_7 = 9.25$ | $n_4 = 1.62041$ | $\nu_4 = 60.3$ |
| $r_8 = -284.555$ | | |
| $d_8 = 6.35$ | | |
| $r_9 = 62.534$ | | |
| $d_9 = 9.94$ | $n_5 = 1.6516$ | $\nu_5 = 58.67$ |
| $r_{10} = -140.312$ | | |
| $d_{10} = 5.52$ | $n_6 = 1.74077$ | $\nu_6 = 27.79$ |
| $r_{11} = 302.355$ | | |
| $d_{11} = 3.31$ | | |
| $r_{12} = -103.484$ | | |
| $d_{12} = 2.48$ | $n_7 = 1.834$ | $\nu_7 = 37.2$ |
| $r_{13} = 56.398$ | | |
| $d_{13} = 5.47$ | | |
| $r_{14} = -1097.121$ | | |
| $d_{14} = 6.40$ | $n_8 = 1.72342$ | $\nu_8 = 38.0$ |
| $r_{15} = -60.387$ | | |
| $d_{15}$ (variable) | | |
| $r_{16} = -87.445$ | | |
| $d_{16} = 4.17$ | $n_9 = 1.50137$ | $\nu_9 = 56.4$ |
| $r_{17} = -87.567$ | | |
| $f = 100 \sim 186.5$ | | |
| $f_1 = -140.005$, | $f_2 = 91.711$, | $f_3 = 12020.667$ |

| | wide position | standard position | teleposition |
|---|---|---|---|
| f | 100 | 138 | 186.5 |
| $d_6$ | 62.524 | 26.901 | 2.565 |
| $d_{15}$ | 10.014 | 34.922 | 67.087 | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbol $n_1$ through $n_9$ respectively represent refractive indices of respective lenses, reference symbol $\nu_1$ through $\nu_9$ respectively represent Abbe's numbers of respective lenses, reference symbols $f_1$, $f_2$ and $f_3$ respectively represent focal length of said first, second and third lens units, and reference symbol f represents the focal length of the lens system as a whole.

* * * * *